United States Patent
Wang et al.

(10) Patent No.: US 9,611,639 B2
(45) Date of Patent: Apr. 4, 2017

(54) ROOFING MEMBRANES WITH EXPANDABLE GRAPHITE AS FLAME RETARDANT

(71) Applicant: FIRESTONE BUILDING PRODUCTS CO, LLC, Indianapolis, IN (US)

(72) Inventors: Hao Wang, Carmel, IN (US); Wensheng Zhou, Carmel, IN (US); Joseph Carr, Indianapolis, IN (US)

(73) Assignee: Firestone Building Products Co., LLC, Indianapolis, IN (US)

( * ) Notice: Subject to any disclaimer, the term of this patent is extended or adjusted under 35 U.S.C. 154(b) by 0 days.

(21) Appl. No.: 14/369,003

(22) PCT Filed: Dec. 31, 2012

(86) PCT No.: PCT/US2012/072309
§ 371 (c)(1),
(2) Date: Jun. 26, 2014

(87) PCT Pub. No.: WO2013/102208
PCT Pub. Date: Jul. 4, 2013

(65) Prior Publication Data
US 2014/0373467 A1    Dec. 25, 2014

Related U.S. Application Data

(60) Provisional application No. 61/581,179, filed on Dec. 29, 2011.

(51) Int. Cl.
| | | |
|---|---|---|
| E04B 1/94 | (2006.01) | |
| E04D 5/10 | (2006.01) | |
| E04D 13/16 | (2006.01) | |
| E04D 5/06 | (2006.01) | |
| B32B 25/16 | (2006.01) | |
| B32B 25/04 | (2006.01) | |
| C08K 3/04 | (2006.01) | |

(52) U.S. Cl.
CPC .............. *E04B 1/94* (2013.01); *B32B 25/042* (2013.01); *B32B 25/16* (2013.01); *C08K 3/04* (2013.01); *E04D 5/06* (2013.01); *E04D 5/10* (2013.01); *E04D 13/16* (2013.01); *B32B 2264/102* (2013.01); *B32B 2264/108* (2013.01); *B32B 2264/12* (2013.01); *B32B 2307/3065* (2013.01); *B32B 2419/06* (2013.01)

(58) Field of Classification Search
CPC ..... C08L 9/00; C08K 3/04; E04B 1/94; E04D 13/16
See application file for complete search history.

(56) References Cited

U.S. PATENT DOCUMENTS

| | | | |
|---|---|---|---|
| 3,280,082 A | 10/1966 | Giulio et al. | |
| 4,657,958 A | 4/1987 | Fieldhouse et al. | |
| 4,732,925 A | 3/1988 | Davis | |
| 4,778,852 A | 10/1988 | Futamura | |
| 4,810,565 A | 3/1989 | Wasitis et al. | |
| 5,389,715 A | 2/1995 | Davis et al. | |
| 5,468,550 A | 11/1995 | Davis et al. | |
| 5,516,817 A | 5/1996 | Slusher et al. | |
| 5,849,133 A | 12/1998 | Senderling et al. | |
| 5,854,327 A * | 12/1998 | Davis ........................ | C08J 5/18 524/445 |
| 5,968,669 A | 10/1999 | Liu et al. | |
| 6,084,008 A | 7/2000 | Liu | |
| 6,120,869 A | 9/2000 | Cotsakis et al. | |
| 6,207,085 B1 | 3/2001 | Ackerman | |
| 6,502,360 B2 | 1/2003 | Carr, III et al. | |
| 6,544,596 B2 | 4/2003 | Clemens et al. | |
| 6,632,509 B1 * | 10/2003 | Davis ...................... | C08L 23/16 428/147 |
| 6,706,793 B2 | 3/2004 | Abu-Isa et al. | |
| 6,849,338 B2 | 2/2005 | Clemens et al. | |
| 7,175,732 B2 | 2/2007 | Robison et al. | |
| 7,605,188 B2 | 10/2009 | Loh et al. | |
| 7,677,009 B2 | 3/2010 | Bowman | |
| 7,749,924 B2 | 7/2010 | Peng | |
| 7,833,575 B2 | 11/2010 | Gupta | |
| 7,878,301 B2 | 2/2011 | Gross et al. | |
| 8,178,449 B2 | 5/2012 | La Vietes et al. | |
| 8,367,760 B1 | 2/2013 | Wang | |
| 2003/0036599 A1* | 2/2003 | Mori ........................ | C08K 3/04 524/496 |
| 2003/0139492 A1 | 7/2003 | Abu-Isa | |
| 2004/0054035 A1* | 3/2004 | Hallissy ................ | C09D 5/185 523/219 |
| 2004/0121152 A1 | 6/2004 | Toas | |
| 2005/0139126 A1 | 6/2005 | Khan et al. | |
| 2005/0145139 A1 | 7/2005 | Khan et al. | |
| 2005/0257875 A1 | 11/2005 | Khan et al. | |
| 2005/0288394 A1 | 12/2005 | Rothman et al. | |
| 2006/0144012 A1 | 7/2006 | Manning et al. | |
| 2006/0160978 A1 | 7/2006 | Gupta et al. | |
| 2006/0191232 A1 | 8/2006 | Salazar et al. | |
| 2006/0217451 A1 | 9/2006 | Bonapersona | |
| 2006/0225618 A1 | 10/2006 | Guevara et al. | |
| 2006/0240224 A1 | 10/2006 | Khan et al. | |
| 2006/0273290 A1 | 12/2006 | Khan et al. | |
| 2006/0280892 A1 | 12/2006 | Davis et al. | |

(Continued)

FOREIGN PATENT DOCUMENTS

| | | |
|---|---|---|
| JP | 1036572 H | 2/1998 |
| WO | 2015/013176 A1 | 1/2015 |

OTHER PUBLICATIONS

JP 2000-109567, Inamori et al., "Production of Fireproof Rubber Compositon and Production of Sheet Made of the Same", Apr. 18, 2000.*

(Continued)

*Primary Examiner* — Hai Vo
(74) *Attorney, Agent, or Firm* — Tom Kingsbury; Arthur M. Reginelli

(57) ABSTRACT

A roofing membrane comprising at least one layer of a cured rubber and expandable graphite dispersed within the cured rubber.

33 Claims, No Drawings

(56) References Cited

U.S. PATENT DOCUMENTS

| | | |
|---|---|---|
| 2007/0166454 A1 | 7/2007 | Gupta |
| 2008/0097043 A1 | 4/2008 | Tong |
| 2008/0102243 A1 | 5/2008 | Gupta |
| 2008/0184642 A1 | 8/2008 | Sebastian et al. |
| 2008/0188590 A1 | 8/2008 | Gupta |
| 2009/0090074 A1 | 4/2009 | Klein |
| 2009/0137168 A1 | 5/2009 | Peng |
| 2009/0309077 A1 | 12/2009 | Gupta et al. |
| 2009/0326117 A1 | 12/2009 | Benussi et al. |
| 2010/0043937 A1* | 2/2010 | Matsunaga ............ B60C 19/002 152/564 |
| 2010/0080920 A1 | 4/2010 | Lagrange et al. |
| 2010/0167013 A1 | 7/2010 | Cruz et al. |
| 2010/0273902 A1 | 10/2010 | Ladely et al. |
| 2010/0320030 A1 | 12/2010 | Ogawa et al. |
| 2011/0002998 A1 | 1/2011 | Ishaque et al. |
| 2011/0011021 A1 | 1/2011 | LaVietes et al. |
| 2011/0015290 A1 | 1/2011 | Schmitz et al. |
| 2011/0065840 A1 | 3/2011 | Freidank et al. |
| 2011/0185656 A1 | 8/2011 | Klein |
| 2011/0245360 A1 | 10/2011 | Hahn et al. |
| 2011/0247215 A1 | 10/2011 | Schmidt et al. |
| 2011/0311793 A1 | 12/2011 | Burgess et al. |
| 2011/0313084 A1 | 12/2011 | Furar et al. |
| 2012/0009407 A1 | 1/2012 | Peeler et al. |
| 2012/0022176 A1 | 1/2012 | Stahl et al. |
| 2012/0045953 A1 | 2/2012 | Wang |
| 2012/0100289 A1 | 4/2012 | Egan et al. |
| 2012/0142240 A1 | 6/2012 | Eling et al. |
| 2012/0174508 A1 | 7/2012 | Brooks et al. |
| 2012/0189838 A1 | 7/2012 | Pellacani et al. |
| 2012/0264843 A1 | 10/2012 | Glos |
| 2012/0266553 A1 | 10/2012 | Shiao et al. |
| 2013/0036714 A1 | 2/2013 | Bolton et al. |
| 2014/0013693 A1 | 1/2014 | Zhou et al. |
| 2014/0127443 A1 | 5/2014 | Zhou et al. |
| 2014/0141672 A1 | 5/2014 | Hubbard et al. |
| 2014/0205789 A1 | 7/2014 | Zhou et al. |
| 2014/0215937 A1 | 8/2014 | Zhou et al. |

OTHER PUBLICATIONS

International Search Report and Written Opinion for International Application No. PCT/US2012/072309 dated Mar. 5, 2013.

* cited by examiner

ROOFING MEMBRANES WITH EXPANDABLE GRAPHITE AS FLAME RETARDANT

This application is the national stage application of International Application Serial No. PCT/US2012/072309, filed Dec. 31, 2012, which claims the benefit of U.S. Provisional Application Ser. No. 61/581,179, filed on Dec. 29, 2012, which is incorporated herein by reference.

FIELD OF THE INVENTION

The present invention relates generally to polymeric sheeting materials, such as EPDM membranes, for roofing applications, that include expandable graphite as a flame retardant.

BACKGROUND OF THE INVENTION

Ethylene-propylene-diene terpolymer (EPDM) is extensively used in a variety of applications. For example, it is particularly useful as a polymeric sheeting material that, because of its physical properties, flexibility, weathering resistance, low temperature properties and heat aging resistance, has gained acceptance as a roofing membrane for covering industrial and commercial roofs. These rubber roofing membranes are typically applied to the roof surface in a vulcanized or cured state and serve as an effective barrier to prevent the penetration of moisture to the covered roof.

These roofing membranes are typically prepared by compounding the base polymer of EPDM with appropriate fillers, processing oils, and other desired ingredients such as plasticizers, antidegradants, adhesive-enhancing promoters, etc., in a suitable mixer, and calendering the resulting compound into the desired thickness. The roofing membrane may also be cured by vulcanizing the resultant sheet in the presence of one or more vulcanizing agents and/or compatible vulcanizing accelerators.

Mineral fillers such as clay, talc, silicas, mica, calcium carbonate, and the like are typically added to a roofing membrane formulation to increase burn resistivity, such as described in U.S. Pat. No. 5,468,550.

Roofing membranes typically also include flame retardants (FR). Decabromodiphenyl oxide (DBDPO) is a well known halogen-containing FR used in EPDM roofing membranes. However, DBDPO has become an environmental concern due to its high bromine content (83 wt %). Due to these concerns, and also to address regulatory changes in the industry, there exists a need for DBDPO-free polymeric compositions, which also provide flame retardant properties.

There is an ongoing desire to find materials that are useful as flame retardants within rubber roofing membranes and that do not have a deleterious impact on the rubber roofing membranes.

SUMMARY OF THE INVENTION

One or more embodiments of the present invention provide a roofing membrane comprising at least one layer of a cured rubber and expandable graphite dispersed within the cured rubber.

DETAILED DESCRIPTION OF ILLUSTRATIVE EMBODIMENTS

Embodiments of the present invention are based upon the discovery of a rubber roofing membrane including expandable graphite as a flame retardant. Advantageously, the membranes of one or more embodiments meet the performance standards as set forth in UL 94 and UL 790 even though the membranes are substantially devoid of halogen-containing flame retardants. Practice of the present invention has been found to be particularly useful in rubber membranes, such as EPDM membranes, and these membranes advantageously meet the performance standards of ASTM D 4637.

Membrane Construction

In one or more embodiments, the membranes of the present invention include cured rubber, expandable graphite, a filler, and an extender. Additionally, these membranes, which may be black or non-black, may include other constituents that are employed in rubber membranes or rubber compounds. The membranes include a cured network deriving from a vulcanizable rubber composition. The various other ingredients may be dispersed throughout the cured network. The membrane may also be referred to as a sheet. The membrane may further comprise fabric reinforcement. In certain embodiments, the membranes are devoid of halogen-containing flame retardants.

In one or more embodiments, the EPDM membrane employed in practice of the present invention includes a cured sheet of ethylene-propylene-diene copolymer rubber (EPDM). Dispersed within the crosslinked network of ethylene-propylene-diene copolymer may be various additives including, but not limited to, filler, oil, wax, antioxidant, antiozonant, flame retardant, and the like. The EPDM sheet may be a single-ply sheet or a multi-ply sheet. The EPDM sheet may be devoid of fabric reinforcement or it may include a fabric reinforcement positioned between two or more plies or layers of rubber.

In one or more embodiments, the membranes, although commonly referred to as single-ply roofing membranes, may include two or more layers that are compositionally distinct. The layers may be formed by calendering. For example, first and second sheets may be formed from first and second respective rubber compositions, and then the respective sheets can be mated and further calendered or laminated to one another, optionally with a reinforcing fabric therebetween. The skilled person will recognize, however, that these layers may be integral to the extent that the calendering and/or curing process creates an interface, at some level, and the layers are generally inseparable. Nonetheless, reference can be made to the individual layers, especially where the layers derive from distinct compositions. Reference may also be made a multi-layered sheet.

In one or more embodiments, each layer of a multi-layered membrane or sheet may include expandable graphite according to the present invention. In other embodiments, a first layer may include expandable graphite and a second is devoid or substantially devoid of expandable graphite. Substantially devoid refers to the absence of that amount of expandable graphite that would otherwise have an appreciable impact on practice of the present invention. For example, in one embodiment, the membrane of the invention is a calendered sheet wherein a first composition including expandable graphite is calendered to form a first layer of the membrane, and a second composition that devoid or substantially devoid of expandable graphite is calendered to form a second layer of the membrane.

In one or more embodiments, the membranes of the present invention are two-layered membranes, wherein the first membrane is black in color and the second layer is non-black in color (e.g. white or generally white). As those skilled in the art appreciate, the black layer can derive from a black composition that would generally include carbon black as a filler. The black layer includes expandable graphite as contemplated by the present invention. The white layer can derive from a white composition that would generally include non-black fillers such as silica, titanium dioxide, and/or clay. White EPDM membranes or membranes having a white EPDM layer are known in the art as disclosed in U.S. Ser. No. 12/389,145, which is incorporated herein by reference.

Generally, the thickness of the sheet ranges from about 20 to about 100 mils, in other embodiments from about 35 to about 95 mils, and in other embodiments from about 45 to about 90 mils. In one or more embodiments, the EPDM sheet meets the performance standards of ASTM D4637.

Useful EPDM membrane is disclosed in, for example, U.S. Pat. Nos. 7,175,732, 6,502,360, 6,120,869, 5,849,133, 5,389,715, 4,810,565, 4,778,852, 4,732,925, and 4,657,958, which are incorporated herein by reference, as well as U.S. Ser. No. 12/982,198, which is incorporated herein by reference. EPDM membranes are commercially available from a number of sources; examples include those available under the tradenames RubberGard (Firestone Building Products) and SURE-SEAL (Carlisle SynTec).

EPDM

In one or more embodiments, the cured rubber derives from an olefinic rubber such as an olefinic terpolymer. In one or more embodiments, the olefinic terpolymer includes mer units that derive from ethylene, α-olefin, and optionally diene monomer. Useful α-olefins include propylene. In one or more embodiments, the diene monomer may include dicyclopentadiene, alkyldicyclopentadiene, 1,4-pentadiene, 1,4-hexadiene, 1,5-hexadiene, 1,4-heptadiene, 2-methyl-1, 5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene, and mixtures thereof. Olefinic terpolymers and methods for their manufacture are known as disclosed at U.S. Pat. No. 3,280,082 as well as U.S. Publ. Appl. No. 2006/0280892, both of which are incorporated herein by reference. Furthermore, olefinic terpolymers and methods for their manufacture as related to non-black membranes are known as disclosed in co-pending U.S. application Ser. Nos. 12/389,145, 12/982,198, and Ser. No. 13/287,417, which are also incorporated herein by reference. For purposes of this specification, elastomeric terpolymers may simply be referred to as EPDM.

In one or more embodiments, the elastomeric terpolymer may include at least 62 weight percent, and in other embodiments at least 64 weight percent mer units deriving from ethylene; in these or other embodiments, the elastomeric terpolymer may include at most 70 weight percent, and in other embodiments at most 69 weight percent, mer units deriving from ethylene. In one or more embodiments, the elastomeric terpolymer may include at least 2 weight percent, in other embodiments at least 2.4 weight percent, mer units deriving from diene monomer; in these or other embodiments, the elastomeric terpolymer may include at most 4 weight percent, and in other embodiments at most 3.2 weight percent, mer units deriving from diene monomer. In one or more embodiments, the balance of the mer units derive from propylene or other α-olefins. The elastomeric terpolymers may be characterized and include cure systems as is known in the art and as disclosed in U.S. Publ. Appl. No. 2006/0280892, incorporated herein by reference.

As is known in the art, it is within the scope of the present invention to blend low Mooney EPDM terpolymers with high Mooney EPDM terpolymers to reduce the overall viscosity of the membrane compound. In other words, EPDM terpolymers with different molecular weights may be utilized to accommodate processing.

As is known in the art, the rubber may be cured with a curative or cure system. The elastomeric terpolymers (e.g. EPDM) can be cured by using numerous techniques such as those that employ sulfur cure systems, peroxide cure systems, and quinone-type cure systems. The sulfur cure systems may be employed in combination with vulcanizing accelerators.

In one or more embodiments, the sulfur cure systems may be employed in combination with vulcanizing accelerators. Useful accelerators include thioureas such as ethylene thiourea, N,N-dibutylthiourea, N,N-diethylthiourea and the like; thiuram monosulfides and disulfides such as tetramethylthiuram monosulfide (TMTMS), tetrabutylthiuram disulfide (TBTDS), tetramethylthiuram disulfide (TMTDS), tetraethylthiuram monosulfide (TETMS), dipentamethylenethiuram hexasulfide (DPTH) and the like; benzothiazole sulfenamides such as N-oxydiethylene-2-benzothiazole sulfenamide, N-cyclohexyl-2-benzothiazole sulfenamide, N,N-diisopropyl-2-benzothiazolesulfenamide, N-tert-butyl-2-benzothiazole sulfenamide (TBBS) (available as Delac® NS from Chemtura, Middlebury, Conn.) and the like; other thiazole accelerators such as 2-mercaptobenzothiazole (MBT), benzothiazyl disulfide (MBTS), N,N-diphenylguanidine, N,N-di-(2-methylphenyl)-guanidine, 2-(morpholinodithio)benzothiazole disulfide, zinc 2-mercaptobenzothiazole and the like; dithiocarbamates such as tellurium diethyldithiocarbamate, copper dimethyldithiocarbamate, bismuth dimethyldithiocarbamate, cadmium diethyldithiocarbamate, lead dimethyldithiocarbamate, sodium butyldithiocarbamate, zinc diethyldithiocarbamate, zinc dimethyldithiocarbamate, zinc dibutyldithiocarbamate (ZDBDC) and mixtures thereof. Sulfur donor-type accelerators (e.g. dimorpholino disulfide and alkyl phenol disulfide) may be used in place of elemental sulfur or in conjunction with elemental sulfur if desired.

Examples of suitable peroxides that can be used as curing agents or co-curing agents include alpha-cumyl hydroperoxide, methylethylketone peroxide, hydrogen peroxide, acetylacetone peroxide, t-butyl hydroperoxide, t-butyl peroxybenzoate, 2,5-bis(t-butyl peroxy)-2,5-dimethylhexene, lauryl peroxide, benzoyl peroxide, 2,4-dichlorobenzoyl peroxide, dibenzoyl peroxide, bis(p-monomethylene-benzoyl) peroxide, bis(p-nitrobenzoye peroxide, phenylacetyl peroxide, and mixtures thereof.

Examples of inorganic peroxides which can be used as co-curing agents with p-quinone dioxime include lead peroxide, zinc peroxide, barium peroxide, copper peroxide, potassium peroxide, silver peroxide, sodium peroxide, calcium peroxide, metallic peroxyborates, peroxychromates, peroxydicarbonates, peroxydiphosphates, peroxydisulfates, peroxygermanates, peroxymolybdates, peroxynitrates, magnesium peroxide, sodium pyrophosphate peroxide, and mixtures thereof.

Examples of polysulfide activators for the quinone-type co-curing agents include calcium polysulfide, sodium polysulfide, as well as organic polysulfides having the general formula R—$(S)_x$—R, wherein R is a hydrocarbon group and x is a number from 2-4. Examples of organic polysulfides are disclosed in U.S. Pat. No. 2,619,481, which is incorporated herein by reference.

Conventional radiation equipment and techniques can also be employed in the practice of this invention. Suitable ionizing crosslinking promoters that can be used include: liquid high-vinyl 1,2-polybutadiene resins containing 90 percent 1,2-vinyl content; Sartomer SR-206 (ethylene glycol dimethacrylate), Di-Cup R(dicumyl peroxide, about 98 percent active), and Pental A (pentaerythritol resin prepared from tall oil). These chemical additives are preferably compatible with the other ingredients in the composition, they may also function to reduce the dosage of ionizing radiation needed to obtain the desired level of crosslinking.

Sulfur and sulfur-containing cure systems may be used, and may also be used with an accelerator. Suitable amounts of sulfur can be readily determined by those skilled in the art. In one or more embodiments roughly about 1 part by weight (pbw) sulfur per 100 parts by weight rubber (phr) may be used. The amount of accelerator can also be readily determined by those skilled in the art.

Expandable Graphite

Expandable graphite may also be referred to as expandable flake graphite, intumescent flake graphite, or expandable flake; and, for the purposes herein, these terms may be used interchangeably.

In one or more embodiments, expandable graphite includes intercalated graphite in which an intercallant material is included between the graphite layers of graphite crystal or particle. Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation.

Commercially available examples of expandable graphite include HPMS Expandable Graphite (HP Materials Solutions, Inc., Woodland Hills, Calif.) and Expandable Graphite Grades 1721 (Asbury Carbons, Asbury, N.J.). Other commercial grades contemplated as useful in the present invention include 1722, 3393, 3577, 3626, and 1722HT (Asbury Carbons, Asbury, N.J.).

In one or more embodiments, the expandable graphite may be characterized as having a mean or average size in the range from about 30 µm to about 1.5 mm, in other embodiments from about 50 µm to about 1.0 mm, and in other embodiments from about 180 to about 850 µm. In certain embodiments, the expandable graphite may be characterized as having a mean or average size of at least 30 µm, in other embodiments at least 44 µm, in other embodiments at least 180 µm, and in other embodiments at least 300 µm. In one or more embodiments, expandable graphite may be characterized as having a mean or average size of at most 1.5 mm, in other embodiments at most 1.0 mm, in other embodiments at most 850 µm, in other embodiments at most 600 µm, in yet other embodiments at most 500 µm, and in still other embodiments at most 400 µm. Useful expandable graphite includes Graphite Grade #1721 (Asbury Carbons), which has a nominal size of greater than 300 µm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized as having a carbon content in the range from about 70% to about 99%. In certain embodiments, the expandable graphite may be characterized as having a carbon content of at least 80%, in other embodiments at least 85%, in other embodiments at least 90%, in yet other embodiments at least 95%, in other embodiments at least 98%, and in still other embodiments at least 99% carbon.

In one or more embodiments, the expandable graphite may be characterized as having a sulfur content in the range from about 0% to about 8%, in other embodiments from about 2.6% to about 5.0%, and in other embodiments from about 3.0% to about 3.5%. In certain embodiments, the expandable graphite may be characterized as having a sulfur content of at least 0%, in other embodiments at least 2.6%, in other embodiments at least 2.9%, in other embodiments at least 3.2%, and in other embodiments 3.5%. In certain embodiments, the expandable graphite may be characterized as having a sulfur content of at most 8%, in other embodiments at most 5%, in other embodiments at most 3.5%.

In one or more embodiments, the expandable graphite may be characterized as having an expansion ratio (cc/g) in the range from about 10:1 to about 500:1, in other embodiments at least 20:1 to about 450:1, in other embodiments at least 30:1 to about 400:1, in other embodiments from about 50:1 to about 350:1. In certain embodiments, the expandable graphite may be characterized as having an expansion ratio (cc/g) of at least 10:1, in other embodiments at least 20:1, in other embodiments at least 30:1, in other embodiments at least 40:1, in other embodiments at least 50:1, in other embodiments at least 60:1, in other embodiments at least 90:1, in other embodiments at least 160:1, in other embodiments at least 210:1, in other embodiments at least 220:1, in other embodiments at least 230:1, in other embodiments at least 270:1, in other embodiments at least 290:1, and in yet other embodiments at least 300:1. In certain embodiments, the expandable graphite may be characterized as having an expansion ratio (cc/g) of at most 350:1, and in yet other embodiments at most 300:1.

In one or more embodiments, the expandable graphite, as it exists with the asphaltic component of the asphaltic sheet of the present invention, is partially expanded. In one or more embodiments, the expandable graphite is not expanded, however, to a deleterious degree, which includes that amount or more of expansion that will deleteriously the ability to form the sheet product and the ability of the graphite to serve as flame retardant at desirable levels, which include those levels that allow proper formation of the sheet. In one or more embodiments, the expandable graphite is expanded to at most 100%, in other embodiments at most 50%, in other embodiments at most 40%, in other embodiments at most 30%, in other embodiments at most 20%, and in other embodiments at most 10% beyond its original unexpanded size.

In one or more embodiments, the expandable graphite may be characterized as having a pH in the range from about 1 to about 10; in other embodiments from about 1 to about 6; and in yet other embodiments from about 5 to about 10. In certain embodiments, the expandable graphite may be characterized as having a pH in the range from about 4 to about 7. In one or more embodiments, the expandable graphite may be characterized as having a pH of at least 1, in other embodiments at least 4, and in other embodiments at least 5. In certain embodiments, the expandable graphite may be characterized as having a pH of at most 10, in other embodiments at most 7, in other embodiments at most 6.5, in other embodiments at most 6, and in other embodiments at most 5.

In one or more embodiments, the expandable graphite may be characterized by an onset temperature ranging from about 100° C. to about 280° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., in other embodiments at least 170° C., in other embodiments at least 180° C., in other embodiments at least 190° C., and in other embodiments at least 200° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature; it may also be referred to as the temperature at which expansion of the graphite starts.

Complementary Flame Retardants

As mentioned above, the expandable graphite may be used in conjunction with a complementary flame retardant. Flame retardants may include any compound that increases the burn resistivity, particularly flame spread such as tested by UL 94 and/or UL 790, in the polymeric compositions of the present invention. Generally, useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

Exemplary non-halogenated flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), which is sold together as a polyol masterbatch, melamine polyphosphate is available under the tradename Budit™ 3141 (Budenheim), and antimony oxide ($Sb_2O_3$) is commercially available under the tradename Fireshield™. Those flame retardants from the foregoing list that are believed to operate by forming a char layer include ammonium polyphosphate and melamine polyphosphate. Useful flame retardants in the present invention include expandable graphite.

Filler

As mentioned above, the membranes of the present invention include filler. These fillers may include those conventionally employed in the art, as well as combinations of two or more of these fillers. In one or more embodiments, the filler may include carbon black. Examples of useful carbon blacks include those generally characterized by average industry-wide target values established in ASTM D-1765. Exemplary carbon blacks include GPF (General-Purpose Furnace), FEF (Fast Extrusion Furnace), and SRF (Semi-Reinforcing Furnace). One particular example of a carbon black is N650 GPF Black, which is a petroleum-derived reinforcing carbon black having an average particle size of about 60 nm and a specific gravity of about 1.8 g/cc. Another example is N330, which is a high abrasion furnace black having an average particle size about 30 nm, a maximum ash content of about 0.75%, and a specific gravity of about 1.8 g/cc.

Other useful fillers including clay and talc, such as those disclosed in U.S. Publ. Appl. No. 2006/0280892, which is incorporated herein by reference. Still other useful fillers include silica, which may be used in conjunction with a coupling agent.

Extenders

As mentioned above, the membranes of the present invention may include extenders. Useful extenders include paraffinic, naphthenic oils, and mixtures thereof. These oils may be halogenated as disclosed in U.S. Pat. No. 6,632,509, which is incorporated herein by reference. In one or more embodiments, useful oils are generally characterized by low surface content, low aromaticity, low volatility and a flash point of more than about 550° F. Useful extenders are commercially available. One particular extender is a paraffinic oil available under the tradename SUNPAR™ 2280 (Sun Oil Company). Another useful paraffinic process oil is Hyprene P150BS, available from Ergon Oil Inc. of Jackson, Miss.

Other Constituents

In addition to the foregoing constituents, the membranes of this invention may also optionally include mica, coal filler, ground rubber, titanium dioxide, calcium carbonate, silica, homogenizing agents, phenolic resins, flame retardants, zinc oxide, stearic acid, and mixtures thereof as disclosed in U.S. Publ. Appl. No. 2006/0280892, which is incorporated herein by reference. Certain embodiments may be substantially devoid of any of these constituents.

Amounts

In one or more embodiments, the polymeric membranes of this invention include from about 20 to about 50, in other embodiments from about 24 to about 36, and in other embodiments from about 28 to about 32% by weight rubber (e.g., EPDM) based on the entire weight of the membrane.

In one or more embodiments, the polymeric membranes of this invention include from about 1 to about 50, in other embodiments from about 2 to about 40, in other embodiments from about 3 to about 35, in other embodiments from about 5 to about 30, and in other embodiments from about 7 to about 25 parts by weight (pbw) expandable graphite per 100 parts by weight rubber (phr) (e.g., EPDM). In certain embodiments, the polymeric membranes of this invention include at most 50 pbw, in other embodiments at most 40 pbw, in other embodiments at most 35 pbw, in other embodiments at most 30 pbw, in other embodiments at most 25 pbw, in other embodiments at most 20 pbw, and in other embodiments at most 15 pbw expandable graphite phr. In these or other embodiments, the polymeric membranes of this invention include at least 2 pbw, in other embodiments at least 3 pbw, in other embodiments at least 5 pbw, in other embodiments at least 7 pbw, in other embodiments at least 10 pbw, in other embodiments at least 15 pbw, and in other embodiments at least 20 pbw expandable graphite phr.

In one or more embodiments, the polymeric membranes of this invention may include from about 70 to about 100 pbw, in other embodiments from about 75 to about 95 pbw, and in other embodiments from about 77 to about 85 parts by weight carbon black per 100 pbw phr. Certain embodiments may be substantially devoid of carbon black.

In one or more embodiments, the polymeric membranes of this invention may include from about 78 to about 103 pbw, in other embodiments from about 85 to about 100 pbw, and in other embodiments from about 87 to about 98 pbw clay per 100 pbw phr. Certain embodiments may be substantially devoid of clay.

In one or more embodiments, the polymeric membranes of this invention may include from 5 to about 60 pbw, in other embodiments from about 10 to about 40 pbw, and in other embodiments from about 20 to about 25 pbw talc per 100 pbw phr. Certain embodiments may be substantially devoid of talc.

In one or more embodiments, the polymeric membranes of this invention may include from about 55 to about 95 pbw, in other embodiments from about 60 to about 85 pbw, and in other embodiments from about 65 to about 80 pbw extender per 100 pbw phr. Certain embodiments may be substantially devoid of extender.

In one or more embodiments, the membranes of this invention may include from about 12 to about 25 pbw mica per 100 pbw phr. In other embodiments, the membrane includes at most 12 pbw phr mica, and in other embodiments at most 6 pbw mica phr. In certain embodiments, the membrane is devoid of mica.

In one or more embodiments, the membranes of this invention may include from about 10 to about 100 pbw silica phr. In other embodiments, the membrane includes at most 70 pbw silica phr, and in other embodiments at most 55 pbw silica phr. In certain embodiments, the membrane is devoid of silica.

In one or more embodiments, the membranes of this invention include from about 2 to about 10 pbw homogenizing agent phr. In other embodiments, the membrane includes at most 5 pbw homogenizing agent phr, and in other embodiments at most 3 pbw homogenizing agent phr. In certain embodiments, the membrane is devoid of homogenizing agent.

In one or more embodiments, the membranes of this invention include from about 2 to about 10 pbw phenolic resin phr. In other embodiments, the membrane includes less than 4 pbw phenolic resin phr, and in other embodiments less than 2.5 pbw phenolic resin phr. In certain embodiments, the membrane is devoid of phenolic resin.

In one or more embodiments, the membranes of this invention (or one or more layers of a multi-layered membrane) including expandable graphite are devoid or substantially devoid of halogen-containing flame retardants. In one or more embodiments, the membranes or the layers of a membrane including expandable graphite include less than 5 pbw, in other embodiments less than 1 pbw, and in other embodiments less than 0.1 pbw halogen-containing flame retardant phr. In particular embodiments, the membranes of the present invention are substantially devoid of DBDPO.

Methods of Manufacture

The roofing membrane of the present invention can be prepared by conventional means using conventional rubber compounding equipment such as Brabender, Banbury, Sigma-blade mixer, two-roll mill, or other mixers suitable for forming viscous, relatively uniform admixtures. Mixing techniques depend on a variety of factors such as the specific types of polymers used, and the fillers, processing oils, waxes and other ingredients used. In one or more embodiments, the ingredients can be added together in a single shot. In other embodiments, some of the ingredients such as fillers, oils, etc. can first be loaded followed by the polymer. In other embodiments, a more conventional manner can be employed where the polymer added first followed by the other ingredients.

Mixing cycles generally range from about 2 to 6 minutes. In certain embodiments an incremental procedure can be used whereby the base polymer and part of the fillers are added first with little or no process oil, the remaining fillers and process oil are added in additional increments. In other embodiments, part of the EPDM can be added on top of the fillers, plasticizers, etc. This procedure can be further modified by withholding part of the process oil, and then adding it later. In one or more embodiments, two-stage mixing can be employed.

The sulfur cure package (sulfur/accelerator) can be added near the end of the mixing cycle and at lower temperatures to prevent premature crosslinking of the EPDM polymer chains. When utilizing a type B Banbury internal mixer, the dry or powdery materials such as the carbon black and non-black mineral fillers (i.e., untreated clay, treated clays, talc, mica, and the like) can be added first, followed by the liquid process oil and finally the polymer (this type of mixing can be referred to as an upside-down mixing technique).

Once mixed, the rubber composition can then be formed into a sheet via calendering. The compositions of the invention can also be formed into various types of articles using other techniques such as extrusion.

The resultant rubbery compositions may be prepared in sheet form in any known manner such as by calendering or extrusion. The sheet may also be cut to a desired dimension. In one or more embodiments, the resulting admixture can be sheeted to thicknesses ranging from 5 to 200 mils, in other embodiments from 35 to 90 mils, by using conventional sheeting methods, for example, milling, calendering or extrusion. In one or more embodiments, the admixture is sheeted to at least 40 mils (0.040-inches), which is the minimum thickness specified in manufacturing standards established by the Roofing Council of the Rubber Manufacturers Association (RMA) for non-reinforced EPDM rubber sheets for use in roofing applications. In other embodiments, the admixture is sheeted to a thickness of about 45 mils, which is the thickness for a large percentage of "single-ply" roofing membranes used commercially. The sheeting can be visually inspected and cut to the desired length and width dimensions after curing.

The calendered sheeting itself should show good, uniform release from the upper and lower calendar rolls and have a smooth surface appearance (substantially free of bubbles, voids, fish eyes, tear drops, etc.). It should also have uniform release from the suction (vacuum) caps at the splicing table and uniform surface dusting at the dust box.

The membranes of the present invention can be optionally reinforced with scrim. In other embodiments, the membranes are devoid of scrim.

The roof sheeting membranes can be evaluated for physical properties using test methods developed for mechanical rubber goods. Typical properties include, among others, tensile strength, modulus, ultimate elongation, tear resistance, ozone resistance, water absorption, burn resistivity, and cured compound hardness.

Membrane Performance Standards

In one or more embodiments, the membranes of the invention demonstrate burn resistivity that meets or exceeds standards of flame spread such as tested by UL 94 and/or UL 790. Further, the membranes of the invention meet standards of resistance to wind uplift as tested in accordance with test method UL 1897. In these or other embodiments, the membranes of the present invention meet the performance standards of ASTM D 4637.

Membrane Installation

The membranes of this invention may be unrolled over a roof substructure in a conventional fashion, wherein the seams of adjacent sheets are overlapped and mated by using, for example, an adhesive. The width of the seam can vary depending on the requirements specified by the architect, building contractor, or roofing contractor, and they thus do not constitute a limitation of the present invention. Seams can be joined with conventional adhesives such as, for instance, a butyl-based lap splice adhesive, which is commercially available from Firestone Building Products Company as SA-1065. Application can be facilitated by spray, brush, swab or other means known in the art. Also, field seams can be formed by using tape and companion primer such as QuickSeam™ tape and Quick Prime Plus primer, both of which are commercially available from Firestone Building Products Company of Carmel, Ind.

Also, as is known in the art, these membranes can be secured to the roof substructure by using, for example, mechanical fasteners, adhesives (which are often employed to prepare a fully-adhered roofing system), or ballasting. Furthermore, the membranes of this invention are useful in combination with insulation or coverboards or in composite boards as disclosed in U.S. Pat. No. 7,972,688, which is incorporated herein by reference. It is also contemplated to use the concepts of the present invention in EPDM flashings such as those disclosed in U.S. Pat. No. 5,804,661, which is also incorporated herein by reference.

Other Polymeric Membranes

While aspects of this invention have thus far been described with respect to rubber membranes that include expandable graphite, it is also contemplated that expandable graphite may be dispersed within other polymeric membranes. Examples of these membranes include thermal plastic membranes such as thermoplastic vulcanizates (TPVs), thermoplastic olefins (TPOs), and polyvinyl chlorides (PVCs). Processing polymeric compositions further comprising expandable graphite is contemplated using processing techniques, including calendaring for example, that provide processing temperatures lower than the expansion onset temperature of said graphite.

PVC

In at least one embodiment of the present invention, polymeric compositions include polyvinyl chloride compositions further comprising expandable graphite as flame retardant.

In at least one embodiment of the present invention, polymeric compositions include polyvinyl chloride compositions further comprising expandable graphite as flame retardant. In one or more embodiments, the polymeric membranes of this invention include from about 5 to about 60, in other embodiments from about 10 to about 40, and in other embodiments from about 20 to about 25 parts by weight expandable graphite per 100 parts by weight elastomeric terpolymer. In certain embodiments, the polymeric membranes of this invention include at most 60 phr expandable graphite, in other embodiments at most 40 phr, in other embodiments at most 30 phr, in other embodiments at most 25 phr, and in other embodiments at most 20 phr. In certain embodiments, the polymeric membranes of this invention include at least 5 phr expandable graphite, in other embodiments at least 10 phr, in other embodiments at least 15 phr, and in other embodiments at least 20 phr.

In certain embodiments, the polymeric composition is devoid of flame retardants other than expandable graphite.

In order to demonstrate the practice of the present invention, the following examples have been prepared and tested. The examples should not, however, be viewed as limiting the scope of the invention. The claims will serve to define the invention.

EXAMPLES

Samples 1-4

Four non-black rubber formulations were prepared and tested for processing properties. Each rubber formulation included EPDM polymer together with the following ingredients, which amounts are based upon 100 parts by weight of the rubber: about 51 parts by weight (pbw) silica, about 58 pbw titanium dioxide, about 59 pbw oil, about 2 pbw hydrocarbon wax, about 5 pbw polyethylene wax, about 5 pbw zinc oxide, about 3.25 pbw stearic acid, about 2 pbw silane coupling agent, about 1.5 pbw sulfur, about 1.5 pbw of a dithiocarbamate accelerator, and about 0.3 pbw of a thiazole accelerator, as well as those additional ingredients provided in Table I (the ingredients are provided in parts by weight). The formulations were mixed by employing a two-step mixing procedure wherein the curative, accelerators, and a portion of the stearic acid were added in a second, low-temperature mixing step.

TABLE I

| Ingredient | Sample 1 | Sample 2 | Sample 3 | Sample 4 |
|---|---|---|---|---|
| Talc | 41 | | | |
| Expandable Graphite I | | 41 | | |
| Expandable Graphite II | | | 41 | |
| Expandable Graphite III | | | | 41 |
| Processing properties | | | | |
| S' (MH-ML)dNm | 7.22 | 6.03 | 4.06 | 5.65 |
| tc10 | 3.7 | 3 | 1.1 | 5.6 |
| tc50 | 15 | 17 | 15 | 18 |
| tc90 | 38 | 39 | 38 | 39 |

Expandable Graphite I was obtained under the tradename Asbury 1721 graphite (Asbury Carbons) and was characterized by a particle size (nominal size, U.S. Sieve) of 20×50, corresponding to particles having a nominal size greater than 300 μm, a pH of about 1 to about 6, an expansion ratio of 290 to 1 (cc/g), and an on-set expansion temperature of about 200° C. Expandable Graphite II was obtained under the tradename Asbury 3772 graphite (Asbury Carbons) and was characterized by a particle size (nominal size, U.S. Sieve) of 20×50, corresponding to particles having a nominal size greater than 300 μm, a pH of about 5 to about 10, an expansion ratio of 290 to 1 (cc/g), and an on-set expansion temperature of about 200° C. Expandable Graphite III was obtained under the tradename Asbury 3626 graphite (Asbury Carbons) and was characterized by a particle size (nominal size, U.S. Sieve) of 60×200, corresponding to particles having a nominal size greater than 75 μm, a pH of about 5 to about 10, an expansion ratio of 150 to 1 (cc/g), and an on-set expansion temperature of about 105° C.

The processing properties of each composition were evaluated within a Rubber Processing Analyzer set at 160° C. for 45 minutes at 100 cycles per minute and 0.5 deg. The analyzer was set to mimic a moving dirheometer (MDR) at 1.1. The results of the test data are provided in Table I.

Samples 5-16

Twelve additional non-black EPDM samples were prepared in a similar fashion to those samples provided in Table I. These samples were cured into test specimens for mechanical testing according to ASTM D 412, puncture testing according to ASTM D 4833, die C tear testing, as well as cured 6"×6" samples for burn resistivity testing. Specifically, the burn resistivity testing included stapling the rubber sample to a half-inch ISO board on a sample holder that places the membrane and ISO board at a 45 degree angle to the ground. A propane torch with a two-inch flame is positioned such that the flame contacts the end of the membrane. The flame is applied for two minutes and care is taken so that the flame does not contact the ISO board. The burn resistivity of the membrane was visually observed and ranked in numerical fashion from 1 to 5, with 5 representing those membranes providing the best burn resistivity. The ability of the membrane to self-extinguish was also determined by visual inspection and the self-extinguishing nature of the membrane is recorded in Table II.

The relevant ingredients employed in each sample, together with the results of the testing, are provided in Table II.

Samples 17-21

Five black EPDM samples were prepared and tested for physical properties as well as burn resistivity and self-extinguishing properties. Each formulation included EPDM polymer and the following ingredients based upon 100 parts by weight (pbw) of the rubber: 117 pbw carbon black, 45 pbw talc, 67 pbw oil, 5 pbw zinc oxide, 2 pbw stearic acid, 1.3 pbw sulfur, 0.2 pbw of a thiuram accelerator, and 3.6

TABLE II

| Ingredient | Sample 5 | Sample 6 | Sample 7 | Sample 8 | Sample 9 | Sample 10 |
|---|---|---|---|---|---|---|
| Talc | 41 | 20 | — | — | — | — |
| Expandable Graphite I | — | 20 | 41 | 70 | 97 | 156 |
| Expandable Graphite II | — | — | — | — | — | — |
| Expandable Graphite III | — | — | — | — | — | — |
| Testing Mooney Scorch | | | | | | |
| Min. Viscosity | 29.9 | 27.1 | 31.6 | 31.3 | 33.7 | 41.3 |
| T5 Minutes | 45.7 | — | — | — | 59.6 | 42.1 |
| T35 Minutes | — | — | — | — | — | — |
| ASTM 412 Mechanical Properties (unaged) | | | | | | |
| 100% Modulus (psi) | 215 | 268 | 257 | 269 | 279 | 309 |
| Tensile Strength (psi) | 1244 | 953 | 1091 | 660 | 477 | 387 |
| Elongation (%) | 948 | 813 | 827 | 755 | 554 | 412 |
| ASTM Die C Tear (unaged) | | | | | | |
| MD Load Thickness @ Max Load (lb f/in) | 207 | 142 | 158 | 162 | 165 | 133 |
| ASTM D-4833 Puncture (unaged) | | | | | | |
| Abervge Max Load (lb f) | 19.2 | 25 | 12 | 13 | 11 | 13 |
| Burn Resistivity (1-5, with 5 being the best) | 1 | 4 | 4 | 4 | 4 | 4 |
| Self-Extinguishing | No | Yes | Yes | Yes | Yes | Yes |

| Ingredient | Sample 11 | Sample 12 | Sample 13 | Sample 14 | Sample 15 | Sample 16 |
|---|---|---|---|---|---|---|
| Talc | — | — | — | — | 29 | — |
| Expandable Graphite I | 220 | 361 | 20 | 10 | 10 | 6 |
| Expandable Graphite II | — | — | — | — | — | — |
| Expandable Graphite III | — | — | — | — | — | — |
| Testing Mooney Scorch | | | | | | |
| Min. Viscosity | 24.7 | — | 24.9 | 23.1 | 26.2 | 23.0 |
| T5 Minutes | 51.1 | — | — | — | — | — |
| T35 Minutes | — | — | — | — | — | — |
| ASTM 412 Mechanical Properties (unaged) | | | | | | |
| 100% Modulus (psi) | — | — | 205 | 194 | 223 | 174 |
| Tensile Strength (psi) | 238 | 354 | 952 | 1347 | 1094 | 1154 |
| Elongation (%) | 40 | 32 | 977 | 975 | 967 | 945 |
| ASTM Die C Tear (unaged) | | | | | | |
| MD Load Thickness @ Max Load (lb f/in) | 85 | 94 | 159 | 162 | 164 | 156 |
| ASTM D-4833 Puncture (unaged) | | | | | | |
| Abervge Max Load (lb f) | — | 13 | 14 | 16 | 13 | 16 |
| Burn Resistivity (1-5, with 5 being the best) | 5 | 5 | 3 | 3 | 4 | 2 |
| Self-Extinguishing | Yes | Yes | Yes | Yes | Yes | Yes | pbw of a benzothiazole sulfenamide accelerator, as well as those additional ingredients provided in Table III. The formulation was mixed by using a two-step mixing procedure where the curative and accelerators were mixed in a low temperature mixing stage. The results of the physical testing and burn resistivity testing are provided in Table III.

TABLE III

| Ingredient | Sample 17 | Sample 18 | Sample 19 | Sample 20 | Sample 21 |
|---|---|---|---|---|---|
| Expandable Graphite I | 64 | 30 | 45 | — | — |
| Expandable Graphite II | — | — | — | 64 | — |
| Expandable Graphite III | — | — | — | — | 64 |
| Testing Mooney Scorch | | | | | |
| Min. Viscosity | 52.6 | 48.0 | 56.4 | 50.3 | 50.1 |
| T5 Minutes | 36.6 | 37.7 | 29.7 | 36.9 | 38.8 |
| T35 Minutes | — | — | 49.7 | — | — |
| ASTM 412 Mechanical Properties (unaged) | | | | | |
| 100% Modulus (psi) | 548 | 578 | 547 | 567 | 589 |
| Tensile Strength (psi) | 1164 | 976 | 794 | 1047 | 1121 |
| Elongation (%) | 348 | 266 | 248 | 299 | 346 |
| ASTM Die C Tear (unaged) | | | | | |
| MD Load Thickness @ Max Load (lb f/in) | 206 | 210 | 188 | 204 | 202 |
| ASTM D-4833 Puncture (unaged) | | | | | |
| Average Max Load (lb f) | 28.1 | 34.8 | 25.3 | 27.1 | 29.7 |
| Burn Resistivity (1-5, with 5 being the best) | 3 | 5 | 3 | 5 | 3 |
| Self-Extinguishing | Yes | Yes | Yes | Yes | Yes |

Various modifications and alterations that do not depart from the scope and spirit of this invention will become apparent to those skilled in the art. This invention is not to be duly limited to the illustrative embodiments set forth herein.

What is claimed is:

1. A rooting membrane comprising:
   i. a first layer including a cured network of ethylene-propylene-diene rubber, where the cured ethylene-propylene-diene rubber is in the form of a crosslinked network, where said first layer includes from about 20 to about 50% by weight cured ethylene-propylene-diene rubber, from about 70 to about 100 parts by weight carbon black, from about 78 to about 103 parts by weight clay, from about 55 to about 95 parts by weight extender, and from about 1 to about 50 parts by weight expandable graphite, where the parts by weight are based upon 100 parts by weight of the cured ethylene-propylene-diene rubber, where the carbon black, clay, extender, and expandable graphite are dispersed throughout the crosslinked network, and where the expandable graphite has an onset temperature of at least 160° C.; and
   ii. a second layer including a cured network of ethylene-propylene-diene rubber, where said second layer is substantially devoid of expandable graphite.

2. The membrane of claim 1, where said expandable graphite has an onset temperature of at least 170° C.

3. The membrane of claim 1, where said second layer includes at least one of silica, titanium dioxide, and clay.

4. The roofing membrane of claim 1, where the first layer includes from about 3 to about 35 parts by weight expandable graphite per 100 parts by weight of the cured ethylene-propylene-diene rubber.

5. The roofing membrane of claim 1, where the first layer includes from about 5 to about 30 parts by weight expandable graphite per 100 parts by weight of the cured ethylene-propylene-diene rubber.

6. The roofing membrane of claim 1, where the first layer includes from about 7 to about 25 parts by weight expandable graphite per 100 parts by weight of the cured ethylene-propylene-diene rubber.

7. The roofing membrane of claim 1, where the expandable graphite is optionally only partially expanded.

8. The roofing membrane of claim 1, where the expandable graphite is optionally expanded to at most 50% beyond its original unexpanded size.

9. The roofing membrane of claim 1, where the expandable graphite is optionally expanded to at most 20% beyond its original unexpanded size.

10. The roofing membrane of claim 1, where the expandable graphite is optionally expanded to at most 10% beyond its original unexpanded size.

11. A roofing membrane comprising:
    a first layer including about 20 to about 50% by weight cured ethylene-propylene-diene rubber, from about 70 to about 100 parts by weight carbon black, from about 78 to about 103 parts by weight clay, from about 55 to about 95 parts by weight extender, and at least 2 parts by weight expandable graphite, where the parts by weight are based upon 100 parts by weight of the cured ethylene-propylene-diene rubber; and
    a second layer including cured ethylene-propylene-diene rubber, where said second layer is substantially devoid of the expandable graphite.

12. The membrane of claim 11, where the expandable graphite is characterized by a pH of at most 7.

13. The membrane of claim 11, where the expandable graphite is characterized by an onset temperature of at least 170° C.

14. The membrane of claim 11, where the expandable graphite is characterized by an onset temperature of at least 180° C.

15. The membrane of claim 11, where the expandable graphite is characterized by an average particle size in the range from about 30 µm to about 1.5 mm.

16. The membrane of claim 11, where the first layer is black in color and the second layer is non-black in color.

17. The membrane of claim 11, where the first layer having expandable graphite dispersed therein is substantially devoid of a halogen-containing flame retardant.

18. The membrane of claim 11, where the membrane meets performance fire standards as tested by UL 94 and/or UL 790.

19. The membrane of claim 11, where the membrane is substantially devoid of Decabromodiphenyl oxide (DB-DPO).

20. The membrane of claim 11, where the membrane is substantially devoid of flame retardants other than expandable graphite.

21. The membrane of claim 11, where the ethylene-propylene-diene rubber is cured with a sulfur cure system.

22. The membrane of claim 11, where the ethylene-propylene-diene rubber is cured with a peroxide cure system.

23. The membrane of claim 11, where the ethylene-propylene-diene rubber is cured with a quinone cure system.

24. The roofing membrane of claim 11, where the expandable graphite has an onset temperature of at least 160° C.

25. The roofing membrane of claim 24, where the carbon black, clay, extender, and expandable graphite are dispersed throughout a crosslinked network of the cured ethylene-propylene-diene rubber.

26. The roofing membrane of claim 25, where the first layer further includes from about 5 to about 60 parts by weight talc per 100 parts by weight of the cured ethylene-propylene-diene rubber.

27. The roofing membrane of claim 25, where the first layer includes from about 3 to about 35 parts by weight expandable graphite per 100 parts by weight of the cured ethylene-propylene-diene rubber.

28. The roofing membrane of claim 25, where the first layer includes from about 5 to about 30 parts by weight expandable graphite per 100 parts by weight of the cured ethylene-propylene-diene rubber.

29. The roofing membrane of claim 25, where the first layer includes from about 7 to about 25 parts by weight expandable graphite per 100 parts by weight of the cured ethylene-propylene-diene rubber.

30. The roofing membrane of claim 25, where the expandable graphite is optionally only partially expanded.

31. The roofing membrane of claim 30, where the expandable graphite is optionally expanded to at most 50% beyond its original unexpanded size.

32. The roofing membrane of claim 30, where the expandable graphite is optionally expanded to at most 20% beyond its original unexpanded size.

33. The roofing membrane of claim 30, where the expandable graphite is optionally expanded to at most 10% beyond its original unexpanded size.

* * * * *

UNITED STATES PATENT AND TRADEMARK OFFICE
CERTIFICATE OF CORRECTION

PATENT NO. : 9,611,639 B2
APPLICATION NO. : 14/369003
DATED : April 4, 2017
INVENTOR(S) : Wang et al.

Page 1 of 1

It is certified that error appears in the above-identified patent and that said Letters Patent is hereby corrected as shown below:

In the Claims

In Column 15, Line 46, delete "rooting" and insert -- roofing --.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*